United States Patent Office 3,422,143
Patented Jan. 14, 1969

3,422,143
α,α,α',α'-TETRAMETHYL-p-XYLYLENEDIAMINE
Charles G. Bottomley, Wilmington, Del., assignor to E. I. du Pont de Nemours and Company, Wilmington, Del., a corporation of Delaware
No Drawing. Filed Nov. 16, 1964, Ser. No. 411,605
U.S. Cl. 260—570.8         2 Claims
Int. Cl. C07c 87/28; C07c 161/04; C07c 15/00

ABSTRACT OF THE DISCLOSURE

α,α'-diamino-α,α,α',α'-tetraalkylmethylarylenes which are useful in the preparation of polyamides.

FIELD OF THE INVENTION

This invention relates to, and has as its principal objects provision of, certain novel aryl diamines and the preparation of the same.

DETAILS OF THE INVENTION

The compounds of the invention are of the general formula

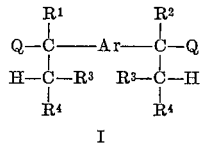

wherein the Q's are —NCS or —NH$_2$, R$^1$ and R$^2$ are lower alkyl, R$^3$ and R$^4$ are hydrogen or lower alkyl and Ar is an arylene group, such as phenylene, naphthylene, biphenylylene or terphenylylene or halogen-, lower alkyl- or lower alkoxy-substituted derivatives of such arylene groups. By lower alkyl is meant a saturated aliphatic hydrocarbon radical of six or fewer carbon atoms. By halogen is meant particularly fluorine, chlorine or bromine.

The diisothiocyanates of this invention are prepared by the reaction of the corresponding olefins with thiocyanic acid as shown by the equation

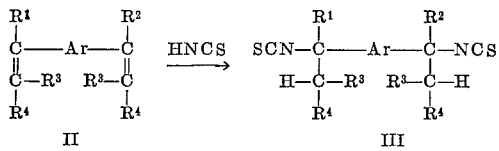

wherein the R's and Ar are defined as above.

Thiocyanic acid for use in this reaction may be introduced as such or may be generated in situ by the reaction of a strong mineral acid such as sulfuric acid on ammonium, sodium, or potassium thiocyanates. No solvent or liquid medium is required to carry out this reaction. However, the use of a reaction medium which is inert to the reactants and products is preferred. Suitable media include such organic liquids as benzene, toluene, chlorobenzene, ether, tetrahydrofuran and the like and their mixtures with water as well as water alone.

The addition of thiocyanic acid to obtain the corresponding isothiocyanates may be carried out at temperatures in the range from 0° to 100° C. Pressures above and below atmospheric pressure are operable, but atmospheric pressure is preferred for convenience.

The diamines of this invention are prepared by the alkaline hydrolysis of the diisothiocyanates followed by acidification according to the equation:

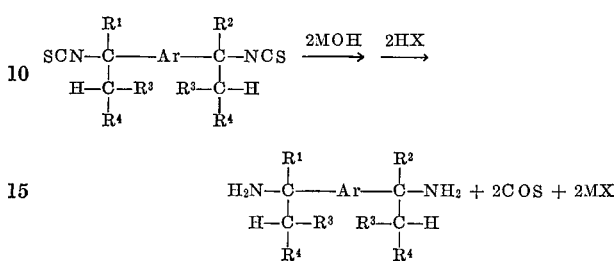

wherein the R's and Ar are defined as above, M is an alkali metal ion or a tetralkylammonium ion, particularly Li, Na, K, tetramethylammonium or tetraethylammonium and X is one equivalent of a mineral acid anion, particularly Cl, Br or ½(SO$_4$).

The above hydrolysis followed by acidification is best carried out in water or a liquid reaction medium containing at least 10% by weight of water. Preferred media comprise 90–0 parts of methanol, ethanol, propanol, or mixtures of these in 10–100 parts of water. The hydrolysis and acidification may be carried out at temperatures in the range from 50° to 300° C., the higher temperatures in this range representing operation in closed systems at superatmospheric pressures. Pressures in the range from 0.1 to 1000 atmospheres are operable and those at atmospheric pressure and up to about 250 atmospheres are preferred.

Olefins of Formula II are prepared by well-known chemical steps from the corresponding diketone. The diketone is first treated with a Grignard reagent, followed by reaction of the resulting diol with hydrogen chloride to yield the corresponding dichloride, which is then dehydrochlorinated with pyridine to yield the olefin as follows.

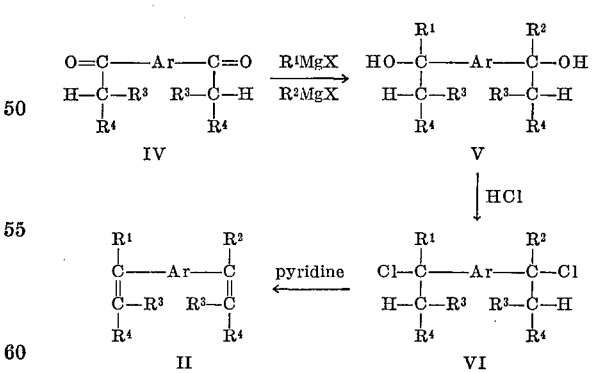

In the above reactions the R's and Ar are as previously defined and X may be chlorine, bromine or iodine.

EMBODIMENTS OF THE INVENTION

In the following examples parts are by weight unless otherwise indicated. Examples 2 and 4 represent a preferred embodiment, embracing the compounds of Formula I where $R^1$ and $R^2$ are methyl, $R^3$ and $R^4$ are hydrogen and Ar is p-phenylene.

Example 1.—α,α,α',α'-tetramethyl-p-xylylene diisothiocyanate

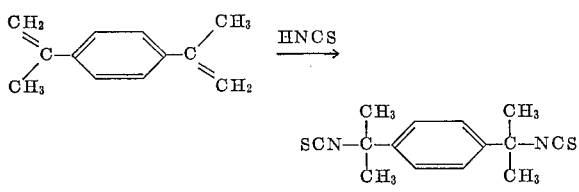

A suspension of 2 parts of sodium thiocyanate in a solution of 2 parts of commercial p-diisopropenylbenzene in 4.5 parts of benzene was heated to 45° C. Sulfuric acid, 75%, 5 parts, was added dropwise. The temperature rose to 50° C. After stirring for 3.5 hours at 45° C., the mixture was cooled in ice and 25 parts of water was added followed by 17.5 parts of benzene. The layers were separated, and the organic layer was washed with water, then with dilute aqueous potassium carbonate, and finally with water. The benzene solution was dried over magnesium sulfate, and the solvent was removed. The residue, 2.8 parts of viscous oil, was α,α,α',α'-tetramethyl-p-xylylene diisothiocyanate. The infrared spectrum showed strong absorption at 4.6μ, characteristic of isothiocyanates, and no absorption at 6.1μ, characteristic of olefin.

Example 2.—α,α,α',α'-tetramethyl-p-xylylene diisothiocyanate

To a suspension of 109 parts of sodium thiocyanate in a solution of 100 parts of p-diisopropenylbenzene in 130 parts of benzene was added over one hour a mixture made up of 200 parts of concentrated sulfuric acid and 62 parts of water. The temperature was kept at 40–45° C. by external cooling. After the addition of acid was complete, the temperature of the reaction was maintained at 40–45° C. for three hours. The flask was cooled, and 500 parts of water and 450 parts of benzene were added. The layers were separated, and the benzene layer was washed consecutively with water, sodium carbonate solution and water. After drying over magnesium sulfate, the benzene was evaporated to obtain as residue a viscous yellow oil that slowly crystallized. Recrystallization from 900 parts of 2B alcohol gave 111 parts (69%) of α,α,α',α'-tetramethyl-p-xylylene diisothiocyanate as white needles, M.P. 65° C.

Analysis.—Calcd. for $C_{14}H_{16}N_2S_2$: C, 60.83; H, 5.84; N, 10.14; S, 23.20. Found: C, 60.79; H, 5.95; N, 10.30; S, 22.95.

Example 3.—α,α,α',α'-tetramethyl-p-xylylenediamine

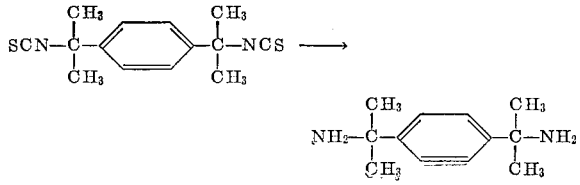

A mixture of 5 parts of potassium hydroxide (commercial grade, 87% pure) and 5 parts of α,α,α',α'-tetramethyl-p-xylylene diisothiocyanate in 40 parts of ethanol was refluxed two hours. The cooled mixture was filtered and poured into 700 parts of water. The aqueous solution was extracted with ether (350 parts in three portions), and the extracts were discarded. The aqueous solution was acidified with concentrated hydrochloric acid during which time carbon oxysulfide was evolved. The acidified solution was basified with 10% sodium hydroxide and then extracted with ether (3×140 parts). The ether extracts were dried over sodium sulfate and evaporated leaving 3.0 parts of crude α,α,α',α'-tetramethyl-p-xylylenediamine as a yellow oil. The infrared spectrum of the diamine had absorption at 3.0μ, typical of amines, and no absorption at 4.6μ, typical of the isothiocyanate functional group.

The diamine was taken up in 35 parts of ether, and the solution was saturated with hydrogen chloride. The diamine dihydrochloride salt precipitated as a white powder which was soluble in water or ethanol. The salt sublimed at 220–250° C. at 1 mm. of pressure.

Example 4.—α,α,α',α'-tetramethyl-p-xylylenediamine

A mixture of 37.5 parts of potassium hydroxide (commercial grade, 87% pure) and 25 parts of α,α,α',α'-tetramethyl-p-xylylene diisothiocyanate in 95 parts of ethanol was refluxed two hours. The resulting suspension was acidified with concentrated hydrochloric acid, and the acidified mixture was then filtered. The filtrate was evaporated under vacuum, and the residue and the filter cake above were dissolved in water. The aqueous solution was filtered, and the clear filtrate was basified to a pH 12 with 10% aqueous sodium hydroxide. To the basic solution was added solid sodium chloride until the solution was saturated. The solution was then extracted with ether (3×140 parts), the ether extracts were dried over sodium sulfate, and then the ether was removed by evaporation. α,α,α',α'-Tetramethyl-p-xylylenediamine, 15.5 parts (89%), was obtained as a white crystalline solid. The diamine had a boiling point of 85° C. at 0.2 mm. of pressure. The dihydrochloride salt of the diamine, infusible up to 400° C., had the following analysis:

Analysis.—Calcd. for $C_{12}H_{22}N_2Cl_2$: C, 54.34; H, 8.36; N, 10.56; Cl, 26.74. Found: C, 54.64; H, 8.58; N, 10.46; Cl, 25.49.

Example 5.—α,α,α',α'-tetramethyl-p-xylylenediamine

A mixture of 5 parts of α,α,α',α'-tetramethyl-p-xylylene diisocyanate and 15 parts of potassium hydroxide (commercial grade, 87% pure) in 40 parts of ethanol was refluxed two hours. The reaction product was poured into 300 parts of water, extracted with ether (3×150 parts), and the aqueous phase was acidified with concentrated hydrochloric acid. The acid solution was then basified with 10% sodium hydroxide, saturated with sodium chloride by adding 100 parts of the salt, and extracted with ether (3×105 parts). Evaporation of the ether left 1.5 parts of a white semisolid, which, on recrystallization from pentane, gave white crystals of α,α,α',α'-tetramethyl-p-xylylenediamine, M.P. 74° C. Spectral analysis confirmed that the sample was identical to that prepared in Example 4.

When the diketones shown in the first column of the table are treated with the Grignard reagents indicated in the second column, followed by conversion of the resulting diol to the dichloride which is then dehydrochlorinated by the action of pyridine as previously described, the diolefins shown in the third column are obtained. When these diolefins are treated with thiocyanic acid according to the procedure of Example 2, the diisothiocyanates shown in the fourth column are obtained. These in turn are converted by alkaline hydrolysis followed by acidification according to the procedure of Example 4 to obtain the diamines shown in the fifth column.

TABLE

| Item | Diketone | Grignard Reagent | Diolefin |
|---|---|---|---|
| 1 | p-Diacetylbenzene | Ethylmagnesium bromide | 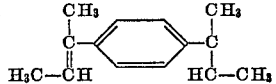<br>α,α′,β,β′-tetramethyl-p-divinylbenzene |
| 2 | 1,4-diacetyl-2,3,5,6-tetrachlorobenzene | Ethylmagnesium bromide | <br>α,α′,β,β′-tetramethyl-1,4-divinyl-2,3,5,6-tetrachlorobenzene |
| 3 | 1,4-diacetyl-2,3,5,6-tetramethylbenzene | Ethylmagnesium bromide | 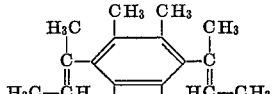<br>α,α′,β,β′,2,3,5,6-octamethyl-1,4-divinylbenzene |
| 4 | 3,4′-diacetylbiphenyl | Ethylmagnesium bromide | 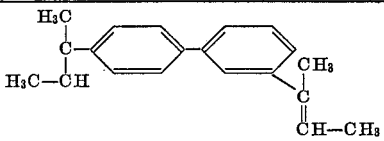<br>α,α′,β,β′,-tetramethyl-3,4′-vinylbiphenyl |
| 5 | 5,5′-diacetyl-2,2′-dimethoxybiphenyl | Ethylmagnesium bromide | 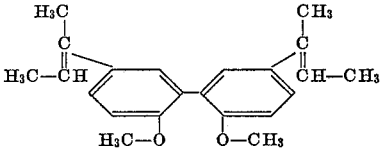<br>2.2′-dimethoxy-α-α′,β-β′-tetramethyl-5,5′-divinylbiphenyl |
| 6 | 4,4′-diacetyl-2,2′,6,6′-tetrachlorobiphenyl | Ethylmagnesium bromide | 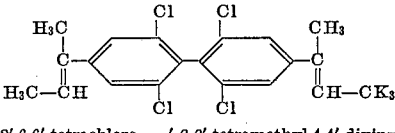<br>2,2′,6,6′-tetrachloro-α,α′,β,β′-tetramethyl-4,4′-divinylbiphenyl |
| 7 | 4,4′-diisobutyrylbiphenyl | Isopropylmagnesium chloride | 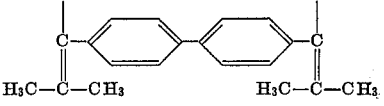<br>α,α′-diisopropyl-β,β,β′,β′-tetramethyl-4,4′-divinylbiphenyl |
| 8 | 4,4′-diheptanoylbiphenyl | n-Hexylmagnesium iodide | 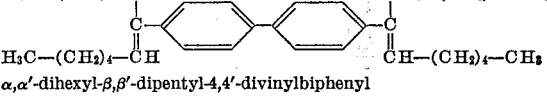<br>α,α′-dihexyl-β,β′-dipentyl-4,4′-divinylbiphenyl |
| 9 | 4,4″-diacetyl-m-terphenyl | Ethylmagnesium chloride | 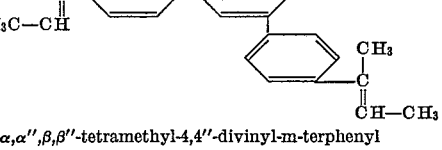<br>α,α″,β,β″-tetramethyl-4,4″-divinyl-m-terphenyl |
| 10 | 4,4″-diisopropenyl-p-terphenyl | Methylmagnesium chloride | 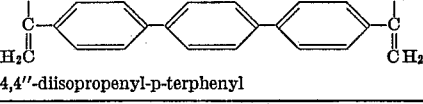<br>4,4″-diisopropenyl-p-terphenyl |
| 11 | 1,4-diacetylnaphthalene | Ethylmagnesium bromide | 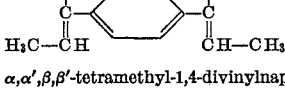<br>α,α′,β,β′-tetramethyl-1,4-divinylnaphthalene |

| Item | Diketone | Grignard Reagent | Diolefin |
|---|---|---|---|
| 12 | 1,5-diacetylnaphthalene | Butylmagnesium iodide | H₃C−(CH₂)₂−CH=C(CH₃)−[1,5-naphthyl]−C(CH₃)=CH−(CH₂)₂−CH₃  α,α'-dimethyl-β,β'-dipropyl-1,5-divinylnaphthalene |
| 1 | α,α'-diethyl-α,α'-dimethyl-p-xylylenediisothiocyanate | | α,α'-diethyl-α,α'-dimethyl-p-xylylenediamine |
| 2 | α,α'-diethyl-α,α'-dimethyl-2,3,5,6-tetrachloro-1,4-xylylenediisothiocyanate | | α,α'-diethyl-α,α'-dimethyl-2,3,5,6-tetrachloro-1,4-xyxlylenediamine |
| 3 | α,α'-diethyl-α,α',2,3,5,6-hexamethyl-1,4-xylylenediisothiocyanate | | α,α'-diethyl-α,α',2,3,5,6-hexamethyl-1,4-xylylenediamine |
| 4 | α,α'-diethyl-α,α'-dimethyl-α,α'-diisothiocyanato-3,4'-dimethylbiphenyl | | α,α'-diamino-α,α'-diethyl-α,α'-dimethyl-3,4'-dimethylbiphenyl |
| 5 | α,α'-diethyl-α,α'-dimethyl-2,2'-dimethoxy-α,α'-diisothiocyanato-5,5'-dimethylbiphenyl | | α,α'-diamino-α,α'-diethyl-α,α'-dimethyl-2,2'-dimethoxy-5,5'-dimethylbiphenyl |
| 6 | α,α'-diethyl-α,α'-dimethyl-α,α'-diisothiocyanato-2,2',6,6'-tetrachloro-4,4'-dimethylbiphenyl | | α,α'-diamino-α,α'-diethyl-α,α'-dimethyl-2,2',6,6'-tetrachloro-4,4'-dimethylbiphenyl |
| 7 | α,α'-diisothiocyanato-α,α,α',α'-tetraisopropyl-4,4'-dimethylbiphenyl | | α,α'-diamino-α,α,α',α'-tetraisopropyl-4,4'-dimethylbiphenyl |
| 8 | α,α'-diisothiocyanato-α,α,α',α'-tetrahexyl-4,4'-dimethylbiphenyl | | α,α'-diamino-α,α,α',α'-tetrahexyl-4,4'-dimethylbiphenyl |
| 9 | α,α''-diethyl-α,α''-dimethyl-α,α''-diisothiocyanato-4,4''-dimethyl-m-terphenyl | | α,α''-diamino-α,α''-diethyl-α,α''-dimethyl-4,4''-dimethyl-m-terphenyl |

| Item | Diisothiocyanate | Diamine |
|---|---|---|
| 10 | ![structure] SCN—C(CH₃)₂—C₆H₄—C₆H₄—C₆H₄—C(CH₃)₂—NCS<br>α,α‴-diisothiocyanato-4,4‴-diisopropyl-p-terphenyl | H₂N—C(CH₃)₂—C₆H₄—C₆H₄—C₆H₄—C(CH₃)₂—NH₂<br>α,α‴-diamino-4,4‴-diisopropyl-p-terphenyl |
| 11 | SCN—C(CH₃)(CH₂CH₃)—(naphthyl)—C(CH₃)(CH₂CH₃)—NCS<br>α,α′-diethyl-α,α′-diisothiocyanato-α,α′-dimethyl-1,4-dimethylnaphthalene | H₂N—C(CH₃)(CH₂CH₃)—(naphthyl)—C(CH₃)(CH₂CH₃)—NH₂<br>α,α′-diamino-α,α′-diethyl-α,α′-dimethyl-1,4-dimethylnaphthalene |
| 12 | SCN—C(CH₃)(CH₂(CH₂)₂CH₃)—(naphthyl)—C(CH₃)(CH₂(CH₂)₂CH₃)—NCS<br>α,α′-dibutyl-α,α′-diisothiocyanato-α,α′-dimethyl-1,5-dimethylnaphthalene | H₂N—C(CH₃)(CH₂(CH₂)₂CH₃)—(naphthyl)—C(CH₃)(CH₂(CH₂)₂CH₃)—NH₂<br>α,α′-diamino-α,α′-dibutyl-α,α′-dimethyl-4,5-dimethylnaphthalene |

The diisothiocyanates of this invention, i.e., compounds of Formula I in which Q is —NCS, are useful for preparing polymeric thiocarbamates by reaction with organic diols in the manner shown in U.S. 2,284,637. Thus when α,α,α′,α′-tetramethyl-p-xylene diisothiocyanate is substituted for hexamethylene diisothiocyanate in the reaction with hexamethylene glycol as shown in Example XV of that patent, a tough, high-softening polymeric thiocarbamate is obtained.

The diisothiocyanates and diamines of Formula I are useful as intermediates to polymers which are characterized by outstanding light stability. The diamines, which are obtained from the diisothiocyanates, react with dibasic organic acid chlorides to form high molecular weight, fiber-forming polyamides which are highly resistant to degradation by sunlight. Thus, a polyamide is prepared by interfacial polymerization between a solution of sebacyl chloride in purified chloroform and an aqueous solution of α,α,α′,α′-tetramethyl-p-xylylenediamine containing sodium hydroxide as acid acceptor. The resulting polyamide is readily converted to orientable fibers by known means.

The diamines of Formula I are also readily converted by reaction with phosgene to the corresponding diisocyanates, i.e., compounds of Formula I in which Q is —NCO. This is illustrated as follows.

Example A

To 575 parts of dry o-dichlorobenzene at 150° C., through which phosgene was being passed at the rate of 80 parts/hour, was added over 1.25 hours a solution of 19 parts of α,α,α′,α′-tetramethyl-p-xylylenediamine in 230 parts of dry o-dichlorobenzene. Phosgene was passed into the mixture for an additional 0.25 hour, and then the solution was cooled and purged with nitrogen. Filtration of the solution removed one part of solids. The solvent was removed under vacuum from the filtrate, and the residue was distilled through a small Vigreux column giving 0.7 part of p-diisopropenylbenzene; 2.4 parts of α,α-dimethyl(p-isopropenyl)benzylisocyanate, B.P. 85–95° C. at 0.1 mm. of pressure; and 16.8 parts of α,α,α′,α′-tetramethyl-p-xylylene diisocyanate, B.P. 100° C. at 0.1 mm. of pressure. This material was identical in physical and spectral properties to that described by Hoover et al., J. Org. Chem. 29, 143 (1964).

The diisocyanates noted above, i.e., compounds of Formula I in which Q is —NCO, are particularly useful as "capping" reactants to improve the whiteness retention of polymers for spinning elastic fibers. Thus when α,α,α′,α′-tetramethyl-p-xylene diisocyanate is substituted for 2,4,6-trimethyl-1,3-phenylene diisocyanate, in the procedure of Example I of U.S. 3,071,557, the resulting polymer yields elastic fibers characterized by greatly improved whiteness retention.

The diisothiocyanates (compounds of Formula I where Q is —(NCS) are useful for preparing the corresponding diols (compounds for Formula I where Q is —OH) which in turn can be dehydrated to yield the diolefins of Formula II. The conversion of one of the diisothiocyanates to a diol is illustrated as follows.

Example B

α,α,α′,α′-Tetramethyl-p-xylylene diisothiocyanate (5.0 g.) in 75 ml. of pyridine and 25 ml. of water was heated to reflux. After two hours the mixture was poured into 500 ml. of ice water, and the mixture was extracted with 500 ml. of ether in three portions. The ethereal solution was dried, and the ether was evaporated to obtain a crystalline product (3 g.). The product was recrystallized from carbon tetrachloride. The first crop of crystals weighed 1.43 g. and melted at 139–139.5° C. Further spectral characterization confirmed the identity of the product as the known p-di-α-hydroxyisopropylbenzene (α,α,α′,α′-tetramethyl-p-xylylene diol).

Since obvious modifications and equivalents in the invention will be evident to those skilled in the chemical arts, I propose to be bound solely by the appended claims.

I claim:

The embodiments of the invention in which an exclusive property or privilege is claimed are defined as follows:

1. A compound of the formula

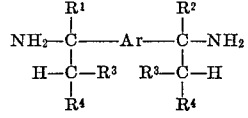

wherein:

$R^1$ and $R^2$ are lower alkyl;

$R^3$ and $R^4$ are selected from the group consisting of hydrogen and lower alkyl; and Ar is selected from the group consisting of phenylene, naphthylene, bisphenylene and terphenylene either unsubstituted or substituted with chlorine, lower alkyl or lower alkoxy.

2. $\alpha,\alpha,\alpha',\alpha'$-Tetramethyl-p-xylylenediamine.

References Cited

UNITED STATES PATENTS

| | | | |
|---|---|---|---|
| 2,080,770 | 5/1937 | Goldschmidth et al. | 260—454 XR |
| 2,464,592 | 3/1949 | Kirk et al. | 260—570.8 |
| 2,685,573 | 8/1954 | Wittbecker et al. | 260—570.8 XR |
| 2,689,255 | 9/1954 | Craig et al. | 260—454 |
| 2,900,369 | 8/1959 | Edwards et al. | 260—570.8 XR |
| 3,111,536 | 11/1963 | Tarlton et al. | 260—454 |
| 3,150,183 | 9/1964 | Buntin | 260—454 XR |

FOREIGN PATENTS 939,107 10/1963 Great Britain.

CHARLES B. PARKER, Primary Examiner.

R. V. HINES, Assistant Examiner.

U.S. Cl. X.R.

260—618, 649, 651, 669, 454, 453, 77.5, 78, 79

UNITED STATES PATENT OFFICE
CERTIFICATE OF CORRECTION

Patent No. 3,422,143　　　　　　　　　　　　January 14, 1969

Charles G. Bottomley

It is certified that error appears in the above identified patent and that said Letters Patent are hereby corrected as shown below:

Column 7, between formulae numbered "12" and "1", above the double lines extending across two columns, insert -- DIISOTHIOCYANATE --. Column 8, between the left portions of the formula numbered "12" and "1", above double lines extending across two columns, insert -- DIAMINE --.

Signed and sealed this 7th day of July 1970.

(SEAL)
Attest:

Edward M. Fletcher, Jr.

Attesting Officer

WILLIAM E. SCHUYLER, JR

Commissioner of Patents

UNITED STATES PATENT OFFICE
CERTIFICATE OF CORRECTION

Patent No. 3,422,143                         January 14, 1969

Charles G. Bottomley

It is certified that error appears in the above identified patent and that said Letters Patent are hereby corrected as shown below:

Column 5, item 10, the name of the compound should read -- 4,4"-diacetyl-p-terphenyl --. Column 6, right portion of the first formula should appear as shown below:

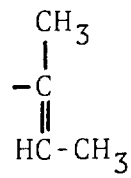

same column 6, left portion of the third formula should appear as shown below:

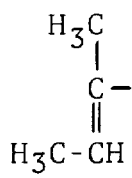

same column 6, left portion of the fourth formula should appear as shown below:

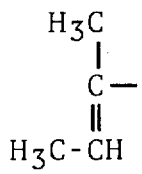

same column 6, right portion of the sixth formula should appear as shown below:

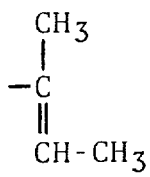

same column 6, left portion of the ninth formula should appear as shown below:

(2)

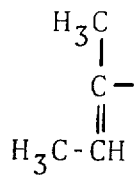

Column 7, right portion of the eighth formula should appear as shown below:

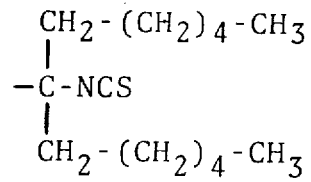

Signed and sealed this 29th day of December 1970.

(SEAL)
Attest:

EDWARD M. FLETCHER, JR.
Attesting Officer

WILLIAM E. SCHUYLER, JR
Commissioner of Patents